United States Patent
Pallotto

(10) Patent No.: US 8,925,281 B1
(45) Date of Patent: Jan. 6, 2015

(54) POLE CAP APPARATUS, AND METHODS OF MAKING AND USING SAME

(71) Applicant: Peter M. Pallotto, Chula Vista, CA (US)

(72) Inventor: Peter M. Pallotto, Chula Vista, CA (US)

( * ) Notice: Subject to any disclaimer, the term of this patent is extended or adjusted under 35 U.S.C. 154(b) by 0 days.

(21) Appl. No.: 14/251,809

(22) Filed: Apr. 14, 2014

(51) Int. Cl.
*E04H 12/00* (2006.01)
*E04C 3/30* (2006.01)

(52) U.S. Cl.
CPC .................................... *E04C 3/30* (2013.01)
USPC ............................. 52/741.3; 52/301; 52/300

(58) Field of Classification Search
USPC ....................... 52/300, 301, 40, 101
See application file for complete search history.

(56) References Cited

U.S. PATENT DOCUMENTS

| | | | |
|---|---|---|---|
| 2,450,345 A * | 9/1948 | Kervin | 52/301 |
| 5,313,757 A * | 5/1994 | Schnepf | 52/301 |
| D370,267 S | 5/1996 | Bayne | |
| 5,887,394 A * | 3/1999 | Workman | 52/301 |
| 6,021,614 A * | 2/2000 | Krieger | 52/301 |
| 6,085,478 A * | 7/2000 | Workman | 52/301 |
| 6,857,235 B2 * | 2/2005 | Niday et al. | 52/301 |
| 7,234,199 B2 * | 6/2007 | Bushey | 16/42 R |
| 2008/0307727 A1 * | 12/2008 | Magee | 52/301 |

* cited by examiner

*Primary Examiner* — Mark Wendell
(74) *Attorney, Agent, or Firm* — Weiner & Burt, P.C.; Irving M. Weiner; Pamela S. Burt

(57) ABSTRACT

A pole cap apparatus to prevent birds from nesting on top of high power electric poles, and a method of installing the apparatus on the pole. The pointed hat conical apparatus fits poles of various diameters. The apparatus is held in place on the hollow pole primarily by the tension of unitary flexible legs.

12 Claims, 4 Drawing Sheets

POLE CAP APPARATUS, AND METHODS OF MAKING AND USING SAME

BACKGROUND OF THE INVENTION

The present invention relates generally to a pole cap apparatus, and methods of making and using same.

More particularly, the present invention relates to a pointed pole cap apparatus which fits poles of various diameters, and methods of making and using same.

Conventional pole caps fail to prevent birds from nesting on the top of high power electric poles.

It is a desideratum of the present invention to avoid the animadversions of conventional pole caps, and to provide a more universal and efficient pole cap apparatus.

SUMMARY OF THE INVENTION

The present invention provides a pole cap apparatus for a pole having at least a hollow upper portion thereof, comprising: a conical main member; said conical main member having a plurality of flexible legs depending from and unitary with said conical main member; and said flexible legs being adapted to be flexed when inserted into the hollow portion of the pole and being held therein by tension on said flexible legs to hold the pole cap apparatus onto the pole.

The present invention also provides an apparatus as described above, including: a first plurality of first double faced tape members; and each said flexible leg having one of said first double faced tape members secured to the outside of an associated flexible leg so that said first double faced tape member adheres to the inside of the pole when said flexible legs are flexibly inserted into the hollow portion of the pole.

The present invention also provides an apparatus as described above, including: a second plurality of second double faced tape members; and each said second double faced tape member being secured to an interior surface of said conical main member so that said second double faced tape member adheres to a top edge of the pole when the apparatus is lowered into the hollow portion of the pole and bottoms out on said top edge of the pole.

The present invention also provides an apparatus as described above, wherein: each said second double faced tape member is disposed between adjacent flexible legs.

The present invention also provides an apparatus as described above, wherein: said conical main member and said plurality of flexible legs are made in one mold to be a unitary integral pole cap apparatus.

The present invention also provides a method of installing a pole cap apparatus for a pole having at least a hollow upper portion thereof, the apparatus including a conical main member and a plurality of flexible legs depending from and unitary with the conical main member, said method comprising the steps of: flexing said flexible legs inwardly while inserting said flexible legs into the hollow portion of the pole; pushing said apparatus into the hollow portion of the pole until an interior surface of the conical mail member contacts a top edge of the pole; whereby the pole cap apparatus is securely held in place on the pole by tension of the flexible legs against an interior surface of the hollow portion of the pole.

The present invention also provides a method as described above, including the steps of: securing a first double faced tape member to the outside of an associated flexible leg; and securing said first double faced tape member to the inside of the hollow portion pole when said flexible legs are flexed outwardly in the hollow portion of the pole.

The present invention also provides any of the methods as described above, including the steps of: securing a second double faced tape member to an interior surface of said conical main member; and securing said second double faced tape member to a top edge of the pole when the apparatus is lowered into the hollow portion of the pole and bottoms out on the top edge of the pole.

An object of the present invention is to provide an apparatus as described hereinabove wherein the apparatus fits multiplied-sized steel high power electric poles.

Another object of the present invention is to provide an apparatus as described hereinabove which prevents birds from nesting on top of high power electric poles.

Another object of the present invention is to provide an apparatus as described hereinabove in the shape of a pointed hat which fits multiple sizes and diameters of poles.

Other objects, advantages, features and modifications of the present invention will become more apparent to those persons skilled in this particular area of technology and to other persons after having been exposed to the present patent application with its accompanying drawings.

DETAILED DESCRIPTION OF THE INVENTION

Figure 1:
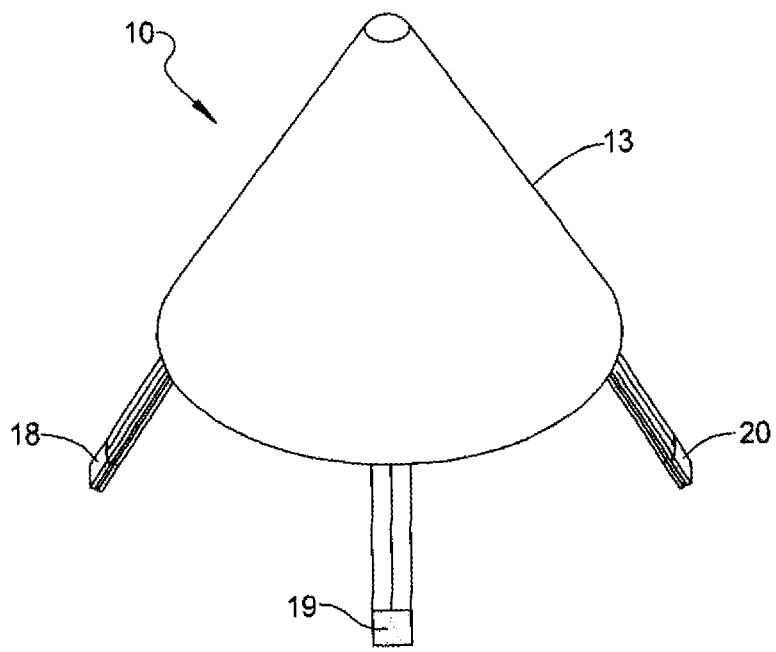
FIG. 1 shows a perspective view of a pole cap apparatus according to a preferred embodiment of the present invention.
Figure 2:
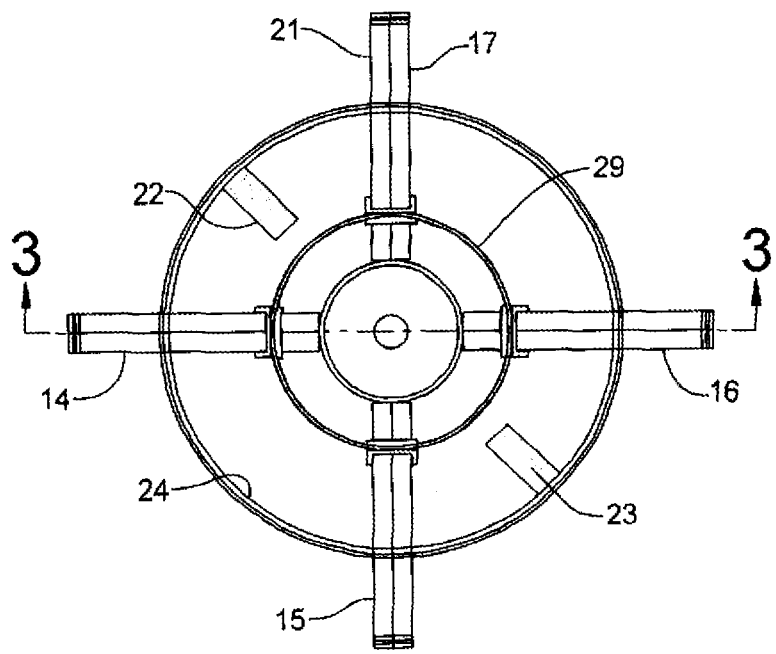
FIG. 2 shows a bottom view of the FIG. 1 apparatus.
Figure 3:
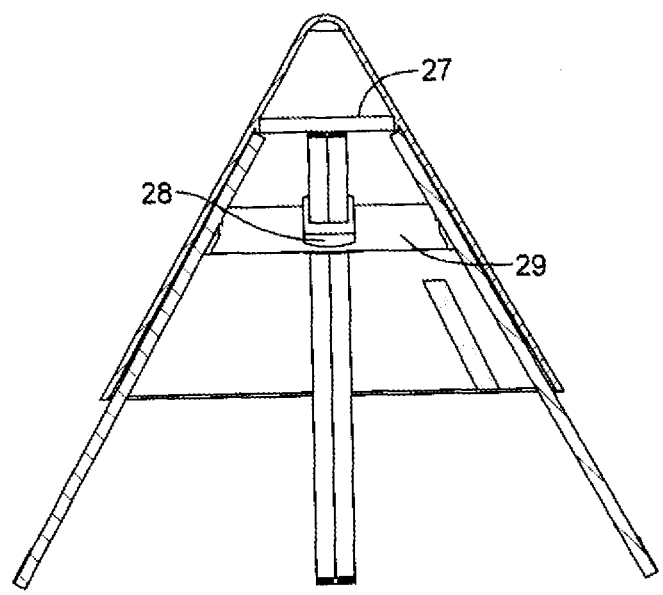
FIG. 3 shows the section of FIG. 2 taken along the line 3-3
Figure 4:
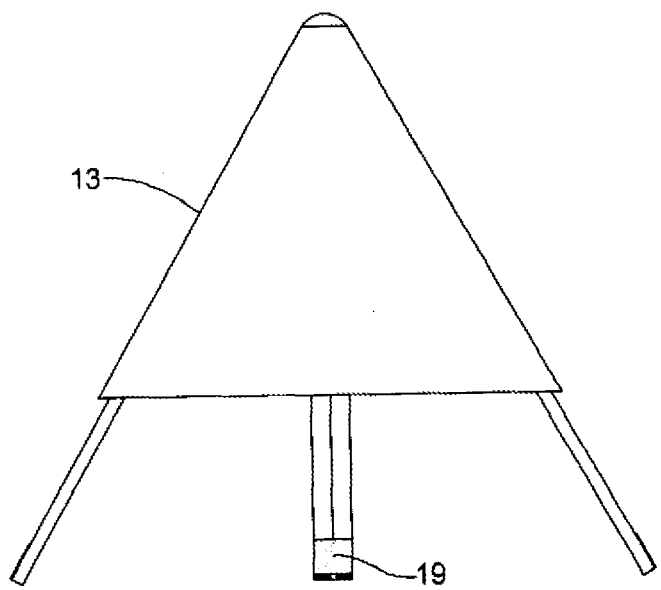
FIG. 4 shows a front elevational view of the FIG. 1 apparatus.

With reference to the drawings, there is shown a pole cap apparatus 10 according to a preferred embodiment of the present invention.

The pole cap apparatus 10 is used for a pole 11 having at least a hollow upper portion 12 thereof, and includes a conical main member 13 having four flexible legs 14, 15, 16 and 17 depending from and unitary with said conical main member 13.

The flexible legs 14, 15, 16 and 17 are adapted to flex when inserted into the hollow portion 12 of the pole 11 and to be held therein by tension on said flexible legs 14, 15, 16 and 17 to hold the pole cap apparatus 10 onto the pole 11.

The pole 11 is typically a steel high power electric pole which is completely hollow.

Preferably, but not necessarily, the pole cap apparatus 11 is made of polypropylene or ABS material.

Preferably, but not necessarily, the conical main member 13 and the flexible legs 14, 15, 16 and 17 are made in one mold to be a unitary integral pole cap apparatus 10.

With reference to FIGS. 2, 3, 5 and 6, the members 27, 28 and 29 are for increased support and strength.

The apparatus 10 is designed and configured to fit poles 11 of various diameters.

The legs 14, 15, 16 and 17 will have tension on them when they are flexed inside the pole 11.

Smaller diameter poles will have more leg tension than larger diameter poles.

For more securement support, there are provided four first double faced tape members 18, 19, 20 and 21.

Each flexible leg 14, 15, 16 and 17 has one of the first double faced tape members 18, 19, 20 and 21, respectively, adhesively secured to the outside of an associated flexible leg so that said first double faced tape members 18, 19, 20 and 21 adhere to the inside of the pole 11 when said flexible legs 14, 15, 16 and 17 are flexibly inserted into the hollow portion 12 of the pole 11.

The first double faced tape members 18, 19, 20 and 21 take the form of ¾-inch by 1-inch long double faced tape strips secured to the outside of each flexible leg 14, 15, 16 and 17, respectively.

The tape members will adhere to the inside of the pole 11.

For further securement support, there are provided one or more second double faced tape members 22 and 23.

Each second double faced tape member 22 and 23 is adhesively secured to an interior surface 24 of the conical main member 13 so that the second double faced tape members 22 and 23 adheres to a top edge 25 of the pole 11 when the apparatus 10 is lowered into the hollow portion 12 of the pole 11 and bottoms out on the top edge 25 of the pole 11.

Each second double faced tape member 22 and 23 is disposed between adjacent flexible legs 14, 15, 16 and 17.

The members 22 and 23 can take the form of 1-inch by 3-inch long double faced tape placed on the inside of the conical main member 13.

When the apparatus 10 is lowered, it will bottom out on the top edge 25 of the pole 11, with the strips 22 and 23 contacting the top edge 25 of the pole 11.

Figure 5:
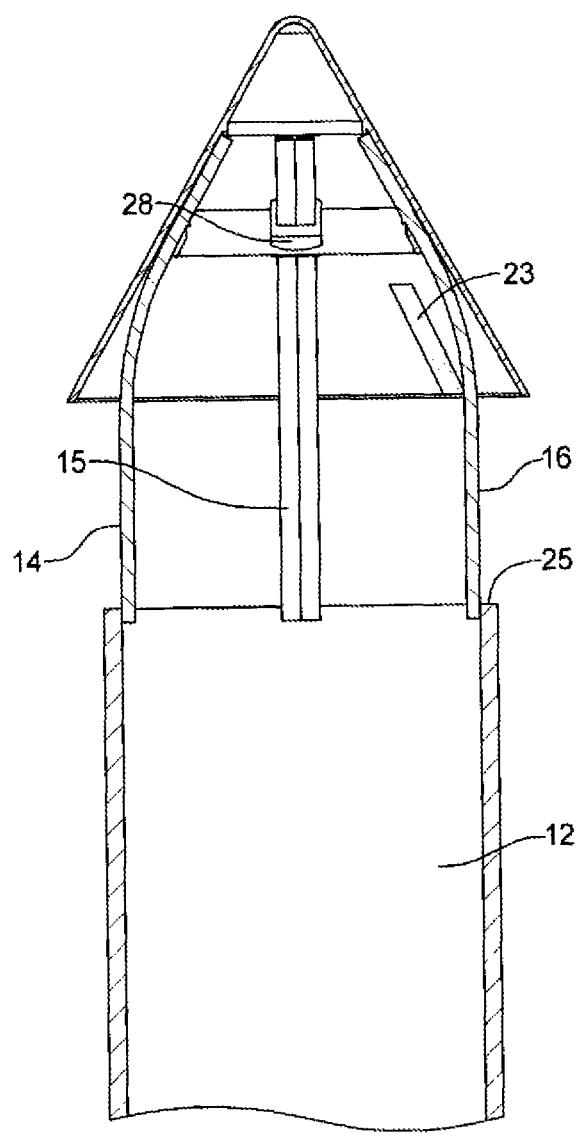
FIG. 5 is sectional view showing the pole cap apparatus starting to be in inserted into a hollow portion of the utility pole.
Figure 6:
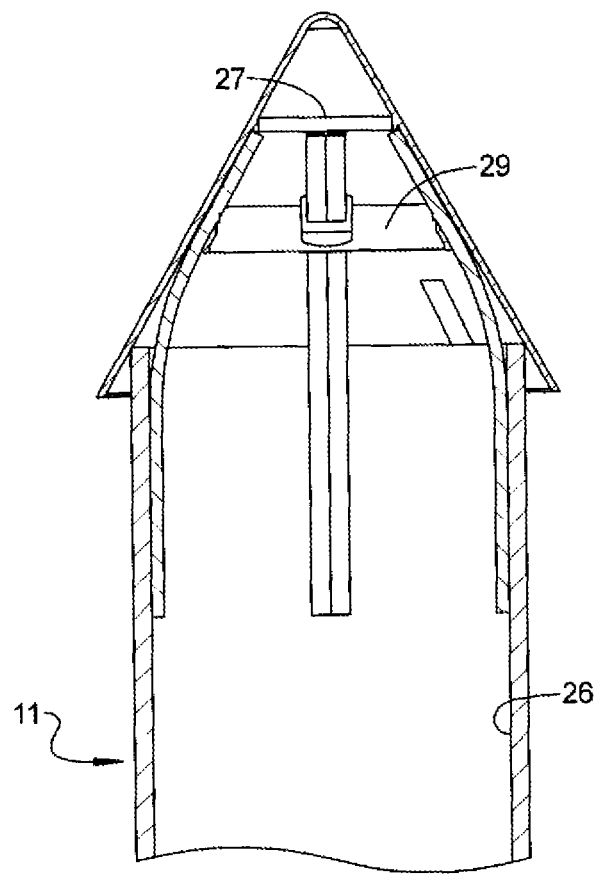
FIG. 6 is sectional view showing the pole cap apparatus fully installed into the hollow portion of the utility pole.

With reference to FIGS. 5 and 6, there is illustrated a method of installing a pole cap apparatus 10 for a pole 11 having at least a hollow upper portion 12 thereof, the apparatus 10 including a conical main member 13 and a plurality of flexible legs 14, 15, 16 and 17 depending from and unitary with the conical main member 13, said method comprising the steps of: flexing the flexible legs 14, 15, 16 and 17 inwardly while inserting the flexible legs 14, 15, 16 and 17 into the hollow portion 12 of the pole 11; pushing the apparatus 10 into the hollow portion 12 of the pole 11 until the interior surface 24 of the conical main member 13 contacts the top edge 25 of the pole 11; whereby the pole cap apparatus 10 is securely held in place on the pole 11 by tension of the flexible legs 14, 15, 16 and 17 against the interior surface 26 of the hollow portion 12 of the pole 11.

FIG. 5 illustrates the apparatus 10 with the legs 14, 15, 16 and 17 being flexed inwardly for insertion into the pole 11.

FIG. 6 illustrates FIG. 5 arrangement when the insertion of the apparatus 10 has progressed to its final installation position onto the pole 11.

While the foregoing describes only one exemplary embodiment of the present invention, it is to be understood that the present invention covers all variations, modifications and changes thereof which will occur to those persons skilled in the art and to other persons after having been exposed to the present patent application.

There has been described hereinabove only one of the many possible embodiments of the present invention which can be practiced in many different ways.

Many changes, modifications, variations, and other uses and applications will become apparent to those persons skilled in this particular area of technology and to others after having been exposed to the present patent application.

Any and all such changes, modifications, variations and other uses and applications which do not depart from the spirit and scope of the present invention are therefore covered by and embraced within the patent claims set forth hereinbelow.

The invention claimed is:

1. A method of installing a conical pole cap apparatus to a hollow pole, the conical pole cap apparatus comprising; a pole cap which is entirely conical in shape having a directrix, a substantially pointed apex, and a plurality of generatrices between the directrix and the apex; said pole cap has no flat horizontal upper exterior portion; a plurality of flexible leg members depending from and unitary with an interior conical surface of the conical pole cap; each flexible leg member has an elongated major central axis; each flexible leg member has its elongated major central axis aligned with an associated generatrix of the conical pole cap; each flexible leg member has a free end portion which extends beyond the directrix of the conical pole cap; each said free end portion is directed away from the apex of the conical pole cap; and said flexible leg members flex when inserted into an upper portion of the hollow pole and securely hold the conical pole cap apparatus in place on the hollow pole by tension of the flexible leg members against an interior surface of the hollow pole, the method comprising the steps of:

flexing said flexible leg members inwardly while inserting said flexible leg members into the upper portion of the hollow pole;

pushing the conical pole cap apparatus into the upper portion of the hollow pole until an interior conical surface of the conical pole cap contacts a top edge of the hollow pole;

whereby the conical pole cap apparatus is securely held in place on the hollow pole by tension of the flexible leg members against the interior surface of the hollow pole.

2. The method of claim 1, including the step of:

using means for adhesively adhering at least a part of said free end portion of said flexible leg members to the interior surface of the hollow pole.

3. A conical pole cap apparatus for a hollow pole, comprising:

a pole cap which is entirely conical in shape having a directrix, a substantially pointed apex, and a plurality of generatrices between the directrix and the apex;

said pole cap has no flat horizontal upper exterior portion;

a plurality of flexible leg members depending from and unitary with an interior conical surface of the conical pole cap;

each flexible leg member has an elongated major central axis;

each flexible leg member has its elongated major central axis aligned with an associated generatrix of the conical pole cap;

each flexible leg member has a free end portion which extends beyond the directrix of the conical pole cap;

each said free end portion is directed away from the apex of the conical pole cap; and said flexible leg members flex when inserted into an upper portion of the hollow pole and securely hold the conical pole cap apparatus in place on the hollow pole by tension of the flexible leg members against an interior surface of the hollow pole.

4. The conical pole cap apparatus of claim 3, including:

means for adhesively adhering at least a part of said free end portion of said flexible leg members to the interior surface of the hollow pole.

5. The apparatus according to claim 4, wherein:

said conical pole cap and said plurality of flexible leg members are made in one mold to be a unitary integral conical pole cap apparatus.

6. The apparatus according to claim 3, wherein:
said conical pole cap and said plurality of flexible leg members are made in one mold to be a unitary integral conical pole cap apparatus.

7. A pole cap apparatus for a pole having at least a hollow upper portion thereof, comprising:
a conical main member;
said conical main member having a plurality of flexible legs depending from and unitary with said conical main member;
said flexible legs flex when inserted into the hollow portion of the pole and being held therein by tension on said flexible legs to hold the pole cap apparatus onto the pole;
a first plurality of first double faced tape members; and
each said flexible leg having one of said first double faced tape members secured to the outside of an associated flexible leg so that said first double faced tape member adheres to the inside of the pole when said flexible legs are flexibly inserted into the hollow portion of the pole.

8. The apparatus according to claim 7, including:
a second plurality of second double faced tape members; and
each said second double faced tape member being secured to an interior surface of said conical main member so that said second double faced tape member adheres to a top edge of the pole when the apparatus is lowered into the hollow portion of the pole and bottoms out on said top edge of the pole.

9. The apparatus according to claim 8, wherein:
each said second double faced tape member is disposed between adjacent flexible legs.

10. The apparatus according to claim 9, wherein:
said conical main member and said plurality of flexible legs are made in one mold to be a unitary integral pole cap apparatus.

11. The apparatus according to claim 8, wherein:
said conical main member and said plurality of flexible legs are made in one mold to be a unitary integral pole cap apparatus.

12. The apparatus according to claim 7, wherein:
said conical pole cap and said plurality of flexible leg members are made in one mold to be a unitary integral pole cap apparatus.

\* \* \* \* \*